US012730078B2

(12) United States Patent
Will et al.

(10) Patent No.: US 12,730,078 B2
(45) Date of Patent: Sep. 8, 2026

(54) METHOD FOR CARRYING OUT A SETTING OPERATION OF A CONTAINER INSPECTION APPARATUS, AND CONTAINER INSPECTION APPARATUS

(71) Applicant: KRONES AG, Neutraubling (DE)

(72) Inventors: Christof Will, Obertraubling (DE); Alexander Hewicker, Wörth an der Donau (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 18/720,946

(22) PCT Filed: Nov. 21, 2022

(86) PCT No.: PCT/EP2022/082592

§ 371 (c)(1),
(2) Date: Jun. 17, 2024

(87) PCT Pub. No.: WO2023/110299

PCT Pub. Date: Jun. 22, 2023

(65) Prior Publication Data

US 2025/0060320 A1 Feb. 20, 2025

(30) Foreign Application Priority Data

Dec. 15, 2021 (DE) ..................... 10 2021 133 164.1

(51) Int. Cl.
*G01N 21/90* (2006.01)
*B65B 57/02* (2006.01)
*G06T 7/00* (2017.01)

(52) U.S. Cl.
CPC ........... *G01N 21/90* (2013.01); *G06T 7/0004* (2013.01); *B65B 57/02* (2013.01); *G06T 2207/20081* (2013.01)

(58) Field of Classification Search
CPC ..... G01N 21/90; G06T 7/0004; G06T 7/0002; G06T 2207/20081; G06T 2207/20076; G06T 2207/20084; B65B 57/02
See application file for complete search history.

(56) References Cited

U.S. PATENT DOCUMENTS 5,202,932 A * 4/1993 Cambier .................. H05G 1/60
378/57
6,172,748 B1 1/2001 Sones et al.
(Continued)

FOREIGN PATENT DOCUMENTS

DE 202004007783 U1 9/2005
DE 102014106992 A1 11/2015
(Continued)

OTHER PUBLICATIONS

Appeal filed in DE Patent Appln. No. 102021133164.1, dated Nov. 23, 2023, with machine English translation, 35 pgs.
(Continued)

*Primary Examiner* — Sang H Nguyen
(74) *Attorney, Agent, or Firm* — HAYES SOLOWAY P.C.

(57) ABSTRACT

A method for carrying out a setting mode of a container inspection apparatus in which a transport device transports containers to be inspected along a predefined transport path and at least one sensor device detects spatially resolved sensor data with respect to the containers to be inspected, in which a plurality of spatially resolved sensor data is provided in a non-volatile memory device, which is retrieved by a setting device in the setting mode; —the setting device is provided with a test container-inspection model of machine learning, which includes a set of parameters set to values and evaluated with respect to working mode and the test container-inspection model is set as the real-time container-inspection model in the real-time analysis device; —for the evaluation of the test container-inspection model, the setting
(Continued)

Figures 1, 1A:
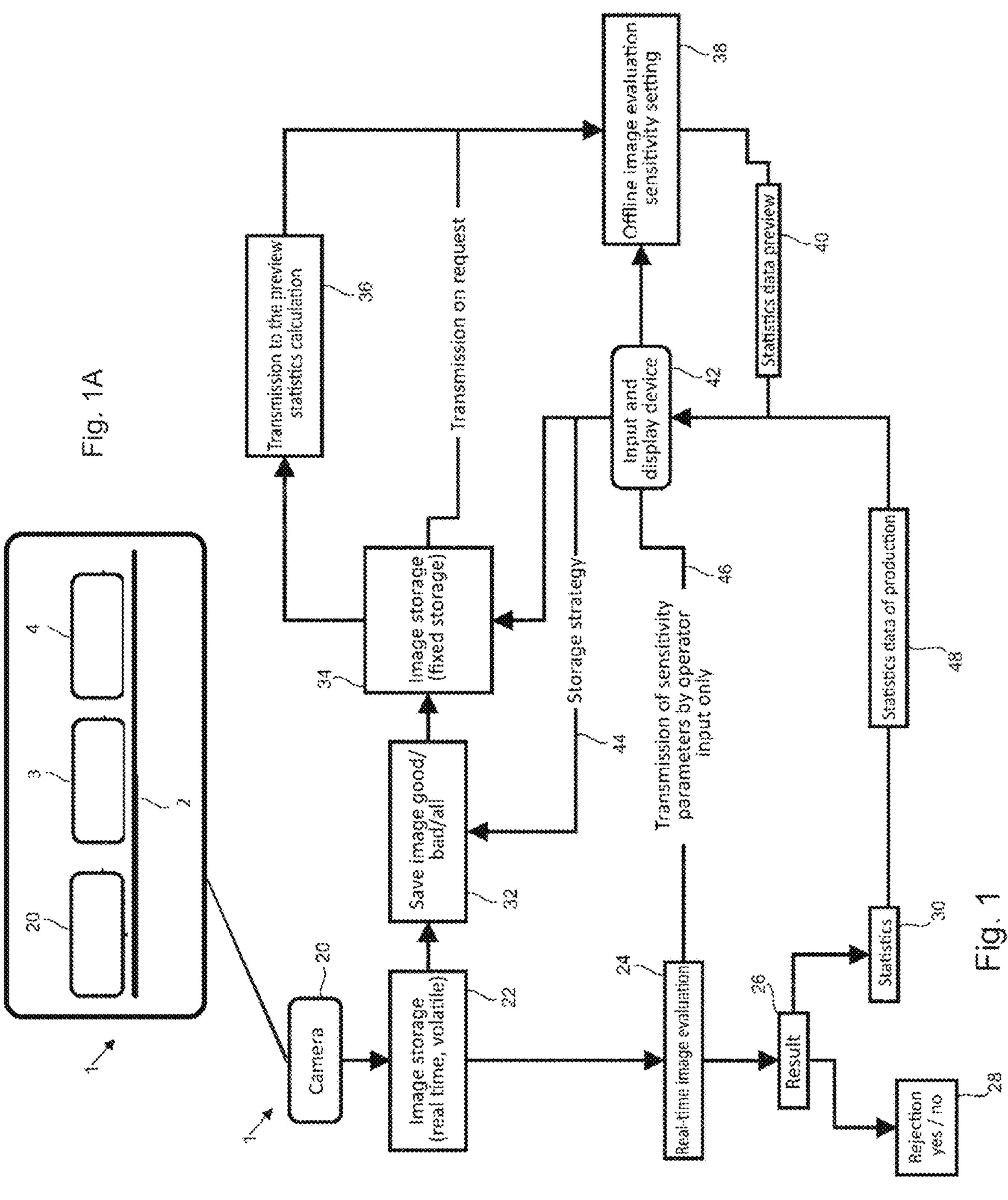

device determines at least one statistical evaluation variable retrieved plurality of spatially resolved sensor data.

20 Claims, 1 Drawing Sheet

(56) References Cited

U.S. PATENT DOCUMENTS

| | | | | |
|---|---|---|---|---|
| 9,869,993 | B2 | 1/2018 | Drath et al. | |
| 2009/0033761 | A1 | 2/2009 | Cetrulo et al. | |
| 2018/0288372 | A1* | 10/2018 | Kirzinger | B67C 3/007 |
| 2019/0022915 | A1 | 1/2019 | Zoelfl et al. | |
| 2020/0242796 | A1* | 7/2020 | Yamada | G06T 7/0008 |
| 2021/0003512 | A1* | 1/2021 | Sosman | G06T 7/0006 |
| 2021/0035276 | A1* | 2/2021 | Ago | G06T 7/62 |
| 2021/0116387 | A1* | 4/2021 | Hewicker | G01N 21/9009 |
| 2022/0051019 | A1* | 2/2022 | Okamura | G06V 20/52 |
| 2022/0269259 | A1 | 8/2022 | Albrecht et al. | |
| 2023/0003665 | A1* | 1/2023 | Will | G01N 21/93 |
| 2023/0175976 | A1* | 6/2023 | Kolb | G01N 21/8851 356/240.1 |
| 2023/0177671 | A1* | 6/2023 | Hewicker | G06V 10/7747 382/141 |
| 2023/0236057 | A1 | 7/2023 | Piana et al. | |

FOREIGN PATENT DOCUMENTS

| | | | |
|---|---|---|---|
| DE | 102006043466 | B4 | 4/2017 |
| DE | 102019205652 | A1 | 10/2020 |
| DE | 102019119352 | A1 | 1/2021 |
| DE | 102019131638 | A1 | 5/2021 |
| DE | 102019132654 | A1 | 6/2021 |
| DE | 102020111254 | A1 | 10/2021 |
| EP | 0483966 | A2 | 9/1991 |
| EP | 1099948 | A2 | 5/2001 |
| EP | 3420418 | A1 | 1/2019 |
| WO | WO2007115795 | A1 | 10/2007 |
| WO | WO2012054655 | A1 | 4/2012 |
| WO | WO2017201398 | A1 | 11/2017 |
| WO | WO2019040859 | A1 | 2/2019 |
| WO | WO2020226921 | A1 | 11/2020 |
| WO | WO2021213779 | A1 | 10/2021 |
| WO | WO2021213832 | A1 | 10/2021 |

OTHER PUBLICATIONS

Appeal filed in DE Patent Appln. No. 102021133164.1, dated Nov. 23, 2023, with machine English translation, 37 pgs.

U.S. Appl. No. 18/720,932, filed Jun. 17, 2024, Hewicker et al.

De Koning, "Optimisation of the weight stabilisation system at Jacobs Douwe Egberts", Master Thesis, University of Twente, Apr. 2021, 130 pgs.

"Conveyor Simulation", https://web.archive.org/web/20180825025814/https://www.createasoft.com/conveyor-simulation, from Aug. 25, 2018, 8 pgs.

Wang, et al., "Machine vision intelligence for product defect inspection based on deep learning and Hough transform", Journal of Manufacturing Systems, vol. 51, Apr. 12, 2019, pp. 52-60, 9 pgs.

German Search Report issued in DE Patent Appln. No. 102021133159.5, dated Sep. 1, 2022, with machine English translation, 12 pgs.

International Search Report and Written Opinion issued in PCT/EP2022/082601, dated Feb. 22, 2023, with English translation, 22 pgs.

German Search Report issued in DE Patent Appln. No. 102021133164.1, dated Sep. 6, 2022, with machine English translation, 9 pgs.

German Examination Report issued in DE Patent Appln. No. 102021133164.1, dated Oct. 13, 2022, with machine English translation, 9 pgs.

International Search Report and Written Opinion issued in PCT/EP2022/082592, dated Mar. 14, 2023, with English translation, 19 pgs.

Pita, J. & Wang, Q.. (2010). A simulation approach to facilitate manufacturing system design. International Journal of Simulation Modelling. 9. 152-164. 10.2507/IJSIMM09(3)4.162.

* cited by examiner

METHOD FOR CARRYING OUT A SETTING OPERATION OF A CONTAINER INSPECTION APPARATUS, AND CONTAINER INSPECTION APPARATUS

CROSS REFERENCE TO RELATED APPLICATIONS

This application is a US National Phase of PCT International Patent Application Serial No. PCT/EP2022/082592, filed Nov. 21, 2022, which claims priority to German Patent Application Serial No. 10 2021 133 164.1, filed Dec. 15, 2021, the contents of which are incorporated herein by reference.

The present invention relates to a container inspection apparatus for inspecting containers and a method for adjusting, in particular for fine adjustment, a container inspection apparatus. The container inspection apparatus has at least one transport device for transporting containers to be inspected as a container stream along a predetermined transport path, and at least one sensor device, such as a camera, in particular for the optical detection of spatially resolved sensor data, such as image data, in relation to a container to be inspected in the container stream. The containers are preferably plastic containers (in particular PET containers), containers whose main component consists of pulp and/or glass containers and/or cans. The containers may be containers from the beverage and/or food and/or cosmetics industries. For example, they can be cans or bottles, such as glass bottles, pulp bottles and plastic bottles.

In container treatment systems, such as container filling systems, a wide variety of sensors and image processing systems are used for process control. For various process steps such as filling, labeling and/or closure, for example, an optical inspection is then carried out.

Image processing systems have to be installed, configured and elaborately parameterized for each process step. This requires a great deal of experience and sensitivity. Once the systems have been accepted, there is usually little or no change by the teleservice or the customer admin.

An inspection apparatus for inspecting containers and an image evaluation device is known from DE 20 2004 007 783 U1 of the applicant.

EP 1 099 948 A2 of the applicant further discloses an apparatus for optical inspection with an image evaluation system, in which an analysis system with an image evaluation program is provided for the analysis of defect images obtained, which substantially corresponds to that of the image evaluation system and with which selected image data are analyzed.

In the construction of systems comprising at least one apparatus for the inspection of containers in a container stream, specifications must be observed in accordance with which a guaranteed contamination variable (or more generally a container state variable) is to be discharged. It is also common practice to increase the detection accuracy of the inspection machine or container inspection apparatus until a false rejection rate desired or accepted by the operator is reached. Preferably, the inspected containers of the container stream are transported to a rejection device, which rejects the containers to be rejected (in accordance with the inspection result).

A false rejection rate is understood in particular to be the ratio of containers rejected by the rejection device (in particular undesirably by the operator of the container inspection apparatus), which have no damage or contamination or in particular further undesirable defects or undesirable properties, to a total container intake of the machine (or here the container inspection apparatus). A value of up to 0.1% (per camera unit) is usually tolerated, depending on the inspection unit or container inspection apparatus.

However, the total rejection rate cannot be chosen arbitrarily because the inspection machine or container inspection apparatus must produce faster by the amount of rejected containers in order not to negatively influence the line efficiency. The overall rejection rates are normally less than 5%, but can reach 10% for a few seconds. However, such an overall rejection rate suitable for production can generally only be set during production operation with the aid of image evaluation parameters, taking into account the bottle quality to be processed.

This means that after the construction of a system and after the start of production, a technician must actually remain on location for a longer period of time in order to adjust the image evaluation parameters in such a manner that the maximum achievable detection accuracy is achieved, taking into account the maximum specified false rejection rate. This is particularly true in view of the fact that a container treatment system almost always has to process several container types and the parameterization process must be carried out individually for each type, taking the rate into account.

It is known from the internal prior art that a camera system runs a set of sensitivity parameters in production (real time). At the same time, ROI (region of interest) changes, parameter (changes) and sensitivity changes can be made without affecting the real-time part. The necessary images can either be "fetched" from the current manufacturing process or from a storage that has previously been loaded with production images. Only when the configurator decides that the parameterization is appropriate, he saves it, i.e. the "offline" parameterization is transferred to production.

How these parameters behave, in particular with regard to false rejection (rate), can only be determined during production, because with a target false rejection rate of <0.1% (per camera), more than 5000 containers (for example approximately 5000-30000 containers in production) should be inspected in order to be able to recognize a trend.

Image processing in inspection machines or container inspection apparatus currently has to be adapted to each production type (of containers produced) by adjusting (evaluation) parameters. Such an adjustment is usually carried out by a configurator (mentioned above) or an operator. This is done in two repetitive steps: The first step consists of adjusting the (evaluation) parameters. The second step consists of production monitoring and assessing the change in rejection rate and inspection performance. These two steps are repeated until a satisfactory inspection performance is achieved.

The apparatuses and methods currently known from the prior art have the disadvantage that the configurator is dependent on production taking place in the second step, the assessment of the inspection performance. Without production, the effect of the last parameter change, which took place in step one, cannot be assessed.

During the commissioning of a new filling line, production is irregular, intermittent and in small batches. The configurator or operator must therefore spend a lot of time assessing the rejection rate and inspection performance. The finer the adjustment of the parameters becomes, the more production needs to be observed in order to assess the increasingly smaller effects. It is hardly possible to adjust parameters in varieties that are not produced at all or only rarely, as an assessment is only possible during the next production of the variety.

The object of the present invention is to overcome the disadvantages known from the prior art and to provide a container inspection apparatus and a method for performing an adjustment operation of a container inspection apparatus, in which the above-described production observation time of the container inspection apparatus can be shortened when the container inspection apparatus is adjusted (i.e. in order to save approximately the above-mentioned 5000-30000 container production observation time) and thus also the total time required to adjust the container inspection apparatus as well as the time required for the configurator or operator to remain at the location of the container inspection apparatus can be reduced as much as possible. The aim of the adjustment of the container inspection apparatus is to achieve the finest possible adjustment of the container inspection apparatus, in which an increase in the detection accuracy of the inspection apparatus is achieved with the greatest possible improvement in the false rejection rate and in compliance with the specifications for the false rejection rate.

Furthermore, the aim is to achieve a setting mode that can be carried out in the shortest possible time, which can also be flexibly adapted to changing conditions on the container inspection apparatus and at the same time allows fine adjustment.

In accordance with the invention, the object is achieved by the subject matters of the independent claims and the subject matters described below. Advantageous embodiments and further embodiments of the invention are the subject matter of the sub-claims.

In a method according to the invention for performing a setting operation of a container inspection apparatus, containers to be inspected are transported in the container inspection apparatus in a working operation as a container stream along a predetermined transport path through a transport device. In the container inspection apparatus, at least one sensor device records spatially resolved sensor data in relation to the containers to be inspected, in particular optically. A real-time evaluation device evaluates the spatially resolved sensor data of the individual inspected containers in real time (in the working mode) using an adjustable real-time container inspection model.

Preferably, the real-time container inspection model can be changed or adjusted by an operator input (for example by an operator or a configurator, approximately via a human-machine interface device). Preferably, a change in the real-time container inspection model set on the real-time evaluation device causes a change in the evaluation of the spatially resolved sensor data.

The method according to the invention comprises providing and/or storing a plurality of spatially resolved sensor data on a non-volatile storage device. In particular, the plurality of spatially resolved sensor data is provided on the non-volatile storage device for retrieval by a, in particular processor-based, setting device in the setting mode. Preferably, the plurality of spatially resolved sensor data provided on the non-volatile storage device is retrieved by a setting device in the setting mode. Preferably, the plurality of spatially resolved sensor data refers to spatially resolved sensor data of a plurality of (in particular different) containers, in particular containers to be inspected. In particular, one container is represented (in particular exactly) on each of the individual spatially resolved sensor data of the plurality of spatially resolved sensor data.

The plurality of spatially resolved sensor data provided is therefore in particular useful for the subsequent setting mode. Preferably, the plurality of spatially resolved sensor data stored on the non-volatile storage device is a plurality of spatially resolved sensor data acquired by the at least one sensor device in the working mode. Preferably, the plurality of spatially resolved sensor data is a predetermined selection of the spatially resolved sensor data recorded in the working mode. Preferably, the spatially resolved sensor data of this plurality of spatially resolved sensor data is transmitted, in particular in real time, preferably after it has been recorded, initially to a volatile storage device and from there (in particular depending on the container type) to the non-volatile storage device and stored there.

Preferably, a plurality of the spatially resolved sensor data recorded by the sensor device is stored on a non-volatile storage device for the setting mode during the working mode, which is retrieved by a, in particular processor-based, setting device during the setting mode.

However, the plurality of spatially resolved sensor data provided can also be spatially resolved sensor data generated externally (in relation to the container inspection apparatus). This could be spatially resolved sensor data from another container inspection apparatus or its sensor device and/or synthetic spatially resolved sensor data, which (at least in sections) represent a container.

The plurality of the spatially resolved sensor data provided is retrieved by a setting device (from the non-volatile storage device) in the setting mode. The setting device preferably retrieves the plurality of spatially resolved sensor data substantially simultaneously from the non-volatile storage device. Preferably, the setting device comprises a human-machine interface device via which the setting process can be controlled by an operator or a configurator. In particular, the setting device serves to optimize the inspection performance of the container inspection apparatus so that the detection accuracy of the container inspection apparatus can be increased as far as possible and, at the same time, approximately a predetermined false defect rate, in particular a predetermined false rejection rate, is not exceeded. The false rejection rate (see above) is usually selected as the false defect rate. The false defect rate, in particular a false rejection rate, is a rate of inspected containers that are classified as defective (or unacceptable) by the container inspection apparatus. In other words, these are those containers that should not be classified as defective, but are nevertheless classified as defective as a result of a configurator of the real-time container inspection model and, in particular (in the case of the false defect rate being the false rejection rate), are rejected from the container flow.

The method further comprises providing that an, in particular trainable, test container inspection model is provided to the setting device. Preferably, the test container inspection model is a machine learning test container inspection model, in particular a trainable one, which comprises a set of in particular trainable parameters which are set to values that have been learned as a result of a training process. In particular, the test container inspection model is to be evaluated with regard to a working mode of the container inspection apparatus in which the test container inspection model is set in the real-time evaluation device (as a real-time container inspection model). In other words, the provided test container inspection model should be evaluated for its use in the real-time evaluation facility (instead of the currently set real-time container inspection model). The test container inspection model can be provided via operator input using the human-machine interface of the setting device.

In particular, an operator can therefore specify a test container inspection model to be evaluated, for example via the human-machine interface device. For example, the operator can select a test container inspection model from a plurality of test container inspection models or initiate the transmission of a test container inspection model (for example, via a communication device).

The test container inspection model is in particular different from the real-time container inspection model (currently) set in the real-time evaluation device. This allows the effect of a change in the real-time container inspection model to the test container inspection model to be tested.

Preferably, the test container inspection model provided should be evaluated to determine whether it leads to a further increase in the detection accuracy of the inspection apparatus, in particular while at the same time the false rejection rate, i.e. the rate of incorrect assessments of a container as defective, can be further reduced or at least a predetermined maximum false rejection rate is not exceeded.

The method according to the invention further comprises that the setting device for evaluating the test container inspection model determines at least one statistical evaluation variable on the basis of the retrieved plurality of spatially resolved sensor data (in a computer-implemented method step). Preferably, the setting device uses the test container inspection model (but not the real-time container inspection model) to determine the statistical evaluation variable and thus evaluates the retrieved plurality of spatially resolved sensor data. The setting device preferably evaluates the retrieved plurality of spatially resolved sensor data in such a manner that the spatially-resolved sensor data are evaluated (independently of one another) in relation to individual containers.

In particular, the statistical evaluation variable is a statistical variable that is determined based on the retrieved plurality of spatially resolved sensor data and, in particular, based on sensor data relating to a plurality of containers. In other words, not only the spatially resolved sensor data corresponding to a single container is used to evaluate the (new) test container inspection model, but a statistical evaluation variable is determined in relation to the corresponding sensor data of a plurality of containers.

It is thus proposed that, for the evaluation of the new test container inspection model to be evaluated, a statistical evaluation variable is determined independently of the working mode of the container inspection apparatus by a plurality of, in particular already existing, spatially resolved sensor data. Preferably, a plurality of recorded spatially resolved sensor data is stored on the non-volatile storage device while the container inspection apparatus is still in a working mode in which the "current" real-time container inspection model or a real-time container inspection model that is still to be fine-tuned is set.

This offers the advantage that a statistical evaluation variable can be determined without having to test the test container inspection model to be evaluated in a working mode of the container inspection apparatus by transferring it to the real-time evaluation device in order to obtain this statistical evaluation variable. If the test container inspection model to be evaluated turns out not to be suitable for practical use, the proposed method can in this case advantageously prevent such a test container inspection model that is not suitable for practical use from being set and used as a real-time container inspection model in the working mode of the container inspection apparatus. In view of the extremely high production speeds, it is advantageous to prevent a large plurality of containers from being incorrectly inspected in a very short time, for example by incorrectly classifying them as defective, when implementing such an operation with a test container inspection model set up in such a manner that is not suitable for practical use. This saves a great deal of material resources, reduces set-up times and prevents unintentional production downtime.

In other words, before the test container inspection model to be evaluated is taken over and transferred to the real-time evaluation device, it is proposed to test this test container inspection model not only on the basis of individual spatially resolved sensor data, but to evaluate it on the basis of a plurality of spatially resolved sensor data (substantially already available at the time the test container inspection model is provided).

A statistical (evaluation) variable is in particular a variable that is determined on the basis of spatially resolved sensor data (stored on the non-volatile storage device) in relation to a plurality of containers. In particular, the plurality of containers preferably means at least 50, preferably at least 100, preferably at least 1000, preferably at least (in particular more than) 5000, preferably at least 10,000 and particularly preferably at least 30,000 containers (spatially resolved sensor data). In particular, the plurality of containers used to determine the statistical (evaluation) variable are containers of the same container type, i.e. preferably containers that have each been treated with the same treatment steps.

Preferably, the determined statistical (evaluation) variable is a statistically significant result. It is also conceivable that the setting device validates whether the statistical evaluation variable is a statistically significant result. It is also conceivable that the setting device determines and/or outputs and/or makes available for output a variable characteristic of the validity and/or significance of the statistical evaluation variable.

In a preferred method, the setting device determines the statistical evaluation variable independently of the real-time container inspection model (currently) set in the real-time evaluation device. This offers the advantage of a non-production setting mode in which, in particular, a statistical evaluation can already be made without the test container inspection model to be evaluated having to be armed in the real-time evaluation device and containers having to be checked by the set test container inspection model during working operation.

Preferably, the test container inspection model is only transmitted to the real-time evaluation device and/or set and used by the real-time evaluation device as a real-time container inspection model after the statistical evaluation variable has been determined.

Preferably, the test container inspection model to be evaluated must first be released before it can be transferred to the real-time evaluation device as a (new) real-time container inspection model. Preferably, the test container inspection model to be evaluated can only be released by an operator or a configurator after the statistical evaluation variable has been determined.

Preferably, the statistical evaluation variable is determined before an operator releases the test container inspection model to adjust the real-time container inspection model.

In a preferred method, the at least one statistical evaluation variable is determined based on the test container inspection model, while at the same time containers are inspected based on the (originally set) real-time container inspection model during running working mode. This offers the advantage that during the adjustment mode and in any case up to the determination of the statistical evaluation variable, a simultaneously running working mode with the (currently) set real-time container inspection model can be continued without interruption (at unchanged production speed).

Preferably, the setting mode and the working mode are decoupled from one another in terms of time. Preferably, the setting mode and the working mode can be decoupled form one another in terms of time. Due to the temporal decoupling of production and setting of the machine, the configurator can also configure a container type that was produced two weeks ago, for example, because the images (or the spatially resolved sensor data) are stored, in particular on the non-volatile storage device.

In particular, the period of the working operation in which the plurality of spatially resolved sensor data (of the inspected containers) is recorded by the sensor device, in particular, and stored on the non-volatile storage device, is decoupled in time from the setting operation (which is performed on the basis of this stored plurality of spatially resolved sensor data) or can be decoupled in time.

Such a temporal decoupling in particular means that the period of working mode relevant for recording and storing the plurality of spatially resolved sensor data does not have to be performed immediately before or at a fixed distance from the start of the setting mode or even during the setting mode, but can be performed in a temporally variable manner before the setting mode (with respect to the start of the setting mode)—at least partially and preferably completely. Conversely, this offers the advantage for the configurator that he can choose the time of implementing the setting mode in a very flexible manner, since the time of implementing the setting mode is not dependent on (simultaneous) production and/or inspection and/or detection of the containers in relation to the container type to be set.

Preferably, the setting mode can be performed and/or is performed with respect to a first container type, while at the same time the working mode of the container inspection apparatus is performed with respect to a second container type different from the first (if a plurality of the spatially resolved sensor data recorded by the sensor device with respect to the first container type has already been stored on the non-volatile storage device in a temporally preceding working mode of the container inspection apparatus).

In a preferred method, an inspected container is discharged from a rejection device in the working mode depending on the evaluation carried out by the real-time evaluation device. Rejection is in particular understood to mean an (at least temporary and preferably final) removal from the container flow.

Preferably, the container inspection apparatus determines a rejection variable for each inspected container, which is in particular characteristic of whether the inspected container is to be rejected (by the rejection device) or not. The rejection variable is preferably determined depending on the evaluation of the spatially resolved sensor data recorded in relation to the respective inspected container. The rejection variable could, for example, be a binary variable (e.g. characteristic for rejection/non-rejection).

Preferably, the statistical evaluation variable is characteristic for a statistical rejection variable of the rejection device and preferably for a prediction of the statistical rejection variable of the rejection device in a working mode of the container inspection apparatus. By "characteristic of a statistical rejection variable of the rejection device" it is to be understood in particular that the "statistical evaluation variable" determined (by the setting device) has a certain informative value in relation to the statistical rejection variable of the rejection device (and this although the setting device evaluates and processes the retrieved sensor data purely "notionally" or exclusively in computer-implemented method steps and in particular although the setting device does not exchange data with the rejection device). This is intended to enable the operator, approximately, to derive a variable from the statistical evaluation variable which he can compare directly or indirectly with a statistical rejection variable determined in the working mode of the inspection apparatus (using containers actually rejected and/or not rejected in the working mode).

In other words, the setting device thus simulates the working mode of the real-time evaluation device and the rejection device, and predicts a statistical rejection variable of the rejection device for an operation of the real-time evaluation device in which the set of test evaluation parameters (then adopted or set as the set of real-time evaluation parameters and) is used to evaluate the spatially resolved sensor data by determining the statistical evaluation variable.

The statistical rejection variable is in particular a statistical variable as described above according to a preferred embodiment.

Preferably, the statistical rejection variable of the rejection device is a relative variable (approximately based on a totality of containers) and/or a rejection rate (based on a time period) and/or a percentage part of the containers to be rejected and/or rejected out of the total number of containers entering the container inspection apparatus (and/or containers detected by exactly one sensor device) or a variable characteristic thereof. Preferably, the statistical rejection rate is the total rejection rate or a variable characteristic therefore.

Preferably, the statistical rejection variable is determined and/or recorded during working mode of the container inspection apparatus (by the rejection device and/or by the container inspection apparatus and/or by the real-time device). This offers the advantage that the prediction of the statistical rejection variable by the setting device can be compared with the (actually) determined statistical rejection variable.

As mentioned above, the determination of the statistical evaluation variable by the setting device advantageously serves to predict a statistical rejection variable of the rejection device in a working mode of the container inspection apparatus with a set test container inspection model. In contrast to a "real" statistical rejection variable of the rejection device determined in the working mode, this statistical evaluation variable is determined outside the working mode and (merely) on the basis of a selection of provided (in particular recorded) spatially resolved sensor data, namely substantially on the basis of the plurality of spatially resolved sensor data stored or provided on the non-volatile storage device. In contrast to this, every container inspected (within a given period of time) is taken into account in the statistical rejection rate determined in the working mode. In extensive experiments, the applicant has found that the behavior of the statistical rejection variable, such as the total rejection rate, is a very good indicator for the evaluation of a new test container inspection model, in particular for the evaluation of a false rejection rate.

A person skilled in the art can judge with a high degree of accuracy (although not 100%) whether a container judged to be faulty by the real-time container inspection model is actually faulty or should be rated as good by examining the stored camera images.

Preferably, a statistical rejection variable determined and/or recorded in a working mode is transmitted to the setting device and/or provided (in particular together with the statistical evaluation variable) to an output device for output or visualization to an operator or configurator. Advantageously, this allows a comparison to be made (for example by the operator or the configurator) between the statistical evaluation variable determined by the setting device for predicting the statistical rejection variable and a corresponding "real" statistical rejection variable determined in the working mode.

If, for example, no (significant) increase in the overall rejection rate of the system in question is shown when a real-time container inspection model is changed, it can be assumed in particular that with increased inspection accuracy (brought about by the change, improvement or optimization to the produced container type of the real-time container inspection model), the false rejection has remained almost the same (in relation to the previously adjusted test container inspection model), which is in particular the intended goal. A reduction in the statistical evaluation parameter can also be an indicator that the false rejection rate decreases while the inspection accuracy remains the same. The advantage of this is that it allows indirect conclusions to be drawn about the effect of a change in the real-time container inspection model's configurator on the false rejection rate, which cannot be determined 100% per se on the basis of camera images.

In a preferred method, the statistical evaluation variable is determined separately from the container inspection apparatus.

In a preferred method, criteria for storing spatially resolved sensor data on the non-volatile storage device can be predefined (by a user). In particular, a storage period can be specified within which the spatially solved sensor data must be stored. Alternatively or additionally, a container type can be specified for which spatially resolved sensor data are to be stored on the non-volatile storage device. Alternatively or additionally, a container number can be specified for which spatially resolved sensor data are to be stored on the non-volatile storage device.

This makes it possible to prepare for an intended setting mode by using the already running working mode (in advance of the adjustment operation) to collect a plurality of spatially resolved sensor data in relation to the desired container type (in relation to which the container inspection apparatus is to be adjusted) for the evaluation of a test container inspection model. Preferably, the plurality of spatially resolved sensor data stored on the non-volatile storage device can be retrieved by the setting device at a predeterminable retrieval time (in particular by user input). Preferably, the retrieval time is separated in time from the storage time. The advantage of this is that an operator or configurator can choose when he wants to carry out the setting mode or an evaluation of the test container inspection model, as the plurality of spatially resolved sensor data required for this has already been determined in an earlier period and is available for retrieval on the non-volatile storage device for the setting mode.

In particular after the basic settings of camera, optics and lamp has been made, saved (camera) images allow offline adjustment of image processing in any variety that has been produced at some point. Setting work and production are thus advantageously decoupled in terms of time.

The configurator does not have to wait for a particular type to be produced again. Even when he is not on the construction site, the sensor data—such as camera images—are stored and is available for his next job. It can also adjust or optimize image processing on days that are scheduled for line maintenance.

This offers the advantage that slow, faltering or missing production no longer prevents the configurator from configuring a type. The effect of a change to a real-time container inspection model can be quickly assessed even during slow production. Production interruptions no longer affect the setting work on the inspection machine's image processing.

Employees of a teleservice, such as those of the manufacturer of the container inspection apparatus and/or its service provider, can also advantageously use the function—and thereby saving time. In particular for online commissioning and RCC commissioning (RCC=Remote Control Center). Camera images document the production process over time, for example changes to the production material or material quality.

Preferably, the rejection rate or a statistical rejection variable of the rejection device for the existing image data set or for the spatially resolved sensor data stored and/or retrieved on the non-volatile storage device is determined without production, i.e. in particular without the container inspection apparatus being executed in working mode.

In a preferred method, the real-time container inspection model currently set in the real-time evaluation device is transmitted to the setting device. Preferably, the setting device determines a statistical evaluation variable based on this, so that the currently set real-time container inspection model can be compared and/or is compared with a different test container inspection model. This offers the advantage that the statistical evaluation variable can be determined for the real-time container inspection model and for the test container inspection model for substantially the same plurality of spatially resolved sensor data. In this manner, a comparison with a (real) statistical rejection variable determined in a working mode, such as the rejection rate, can be used to check and/or check the plausibility of whether the statistical evaluation variable determined by the determination device is sufficiently meaningful. In other words, it can be checked whether the setting device has a sufficiently large data set of spatially resolved sensor data available to determine the statistical evaluation variable. Furthermore, a direct comparison can be made between the real-time container inspection model currently set in the real-time evaluation device and the test container inspection model to be evaluated.

In a preferred method, the setting device repeatedly determines statistical evaluation variables, wherein further spatially resolved sensor data and/or changes to the test container inspection model are taken into account. This offers the advantage that, if the working mode is running in parallel to the setting mode, spatially resolved sensor data currently recorded in the working mode can be taken into account when determining the statistical evaluation variable. Preferably, the setting device repeatedly determines the statistical evaluation variables in the time cycle of the working mode of the container inspection apparatus running parallel to the setting mode. Preferably, a change to the test container inspection model (for example by means of operator input) triggers a determination of the statistical evaluation variable.

In a preferred method, a second test container inspection model to be evaluated is provided to the setting device and, depending on this second test container inspection model, a second statistical evaluation variable is determined on the basis of the retrieved plurality of spatially resolved sensor data. Preferably, the first statistical evaluation variable and the second statistical evaluation variable are determined based on the same plurality of spatially resolved sensor data.

Preferably, the first test container inspection model is used to evaluate the plurality of the spatially resolved sensor data (in particular (camera) images) stored on the non-volatile storage device and, in particular, to determine a first rejection rate (or a first statistical evaluation variable).

If it turns out that the rejection rate, in particular the false rejection rate, is not suitable for practical use (approximately too high), a new provision and/or a change and/or a new training process of a test container inspection model is preferably carried out. If a low rejection rate, in particular the false rejection rate, allows a further increase in detection accuracy, a new test container inspection model is preferably provided and/or the test container inspection model is changed again.

Preferably, the setting device determines at least one statistical evaluation variable for each new test container inspection model to be evaluated.

In a preferred method, the setting device exchanges data with the real-time evaluation device and/or the at least one sensor device (and/or the container inspection apparatus) via a wireless communication connection, and preferably at least in portions via a public network (such as the Internet). Preferably, the wireless communication connection and/or the public network is used to transmit the test container inspection model and/or the plurality of spatially resolved sensor data and/or the real-time container inspection model.

Preferably, the real-time evaluation device determines at least one container state variable, approximately a contamination variable, in relation to the (inspected) container, wherein the container state variable is, for example, characteristic of contamination of the container. The real-time evaluation device preferably uses the real-time container inspection model for this purpose.

In particular, a container state variable is a variable relating to a container state of the container which is represented (in particular recorded) by the spatially resolved sensor data. A container state variable in relation to the (inspected or displayed) container is in particular to be understood as a variable in relation to the (inspected or displayed) container which is characteristic of a quality state and/or a contamination state and/or a defect state and/or a fault state of the (inspected or displayed) container (and thus of a current container state at the time of inspection or detection by the sensor device). For example, the container state variable can be a contamination variable and/or a defect variable and/or a malfunction of the container. Preferably, it is possible to derive from the container state variable in relation to the (inspected or displayed) container whether the container should be rejected.

In particular, the term "container state" of a container is understood to mean a quality state and/or contamination state and/or defect state and/or fault state. In general, the term "container state" can be understood as a state of the container in which the container has a certain and/or predetermined (in particular undesirable) property or a (in particular undesirable) feature, due to the presence of which (in particular by the operator of the container inspection apparatus and/or a container treatment system) it is intended to perform a particular treatment step on the container, and which is therefore to be identified by the container inspection apparatus (with the highest possible detection accuracy). One possible treatment step could, for example, be to reject the container from the container flow.

Preferably, a plurality of (mutually different) classes of container states (in particular defect states and/or fault states) can be predefined. For example, different classes of container states may refer to the respective container state of different areas of the container, which are selected, for example, from a group comprising a bottom area, an outer wall area, a side wall area, a corrugation in the bottom area, a support ring area, a mouth area and similar, and combinations thereof.

The different classes can differ depending on the inspection tasks of the respective sensor unit or sensor device. The method can be used for container bottom, sealing surface, side wall, thread, closure, fill level, label, originality, suspended matter and residual liquid inspections.

Additionally or alternatively, a class of container states may also refer to (exactly or at least) one of (one another) different defect types (such as crack, tear, fracture, etc.) and/or defect types, which may be selected from a group comprising defects, fractures, cracks, different crack types, (glass) fragments, chipping, soiling, soiling types, material distributions in relation to a defect and the like, and combinations thereof.

Preferably, the real-time evaluation device provides (in particular in real time) the container state variable of the rejection device for rejection or ejection of the inspected container (from the container stream) as a function of the at least one container state variable.

It is conceivable that the rejection device determines the rejection variable (in particular exclusively) on the basis of the container status variable (provided and/or transmitted by the real-time evaluation device). It is also conceivable that the rejection variable is already provided and/or transmitted to the rejection device (approximately in the form of the variable derived from the container state variable).

Preferably, the setting device evaluates the retrieved plurality of spatially resolved sensor data using the test container inspection model individually for the spatially resolved sensor data which represent exactly one container and/or are assigned to at least exactly one container. The evaluation is carried out by the setting device determining at least one container status variable for each container (or for the corresponding) spatially resolved sensor data. The determined container status variable refers to the container displayed and/or detected in the evaluated spatially resolved sensor data.

Preferably, the setting device processes the retrieved (predetermined) plurality of spatially resolved sensor data or data derived therefrom using the, in particular trainable, test container inspection model of machine learning. Preferably, the at least one statistical evaluation variable is determined thereby and/or on the basis of this processing (preferably in a computer-implemented method step).

Preferably, at least one container state variable and preferably a plurality of container state variables are determined by processing (spatially resolved) sensor data in relation to (exactly) one container using the test container inspection model.

Preferably, the at least one container state variable refers to (in particular exactly) one, in particular predetermined, class of a container state (in particular specified above). Preferably, the container state variable is characteristic of a probability of the presence of that class of container state in the processed spatially resolved sensor data (of the container represented in the spatially resolved sensor data).

Preferably, the test container inspection model is given at least one class of a container state of a container and preferably a plurality of classes of container states for classifying the spatially resolved sensor data to be processed.

Preferably, the test container inspection model of machine learning is based on an (artificial) neural network. Preferably, the determination of the statistical evaluation variable and/or the determination of the container state variable, such as the statistical rejection variable, is based (in particular thereby) on an or the (artificial) neural network. In particular, the spatially resolved sensor data (of the retrieved plurality of location-resolved sensor data) is processed by means of the in particular trained (artificial) neural network.

The neural network is preferably designed as a deep neural network (DNN), in which the parameterizable processing chain has a plurality of processing layers, and/or a so-called convolutional neural network (CNN) and/or a recurrent neural network (RNN).

If CNNs/DNNs are trained for each (inspection) application, the parameterization effort can be significantly reduced in future. This means that the commissioning time for indoor and outdoor installation can be significantly reduced in future. In the former case, this reduces personnel costs or increases throughput. With the same number of staff, more machines can be produced in the same amount of time or the number of staff can be reduced. For the latter, this also reduces acceptance times and travel costs. This leads to higher throughput and faster billing, which in turn reduces outstanding receivables/liabilities/working capital.

Preferably, the test container inspection model or the (artificial) neural network is fed the data (to be processed), in particular the spatially resolved sensor data (or data derived from it), as input variables. Preferably, the test container inspection model or the artificial neural network maps the input variables to output variables as a function of a parameterizable processing chain, wherein the container state variable or preferably a plurality of container state variables are selected as the output variable.

Preferably, the test container inspection model is trained by machine learning or the artificial neural network using given training data, wherein the training parameterizes the parameterizable processing chain.

In a preferred method, the training process of the test container inspection model utilizes training data comprising a plurality of spatially resolved sensor data (of containers) recorded by the at least one sensor device. This offers the advantage that the training process is already specifically adapted to the container inspection apparatus to be set and, for example, specific conditions of the specific container inspection apparatus, such as optical properties of the sensor device or specific lighting conditions in the container inspection apparatus, can be taken into account directly.

Preferably, the spatially resolved sensor data (recorded by the at least one sensor device) intended for use as training data is provided with (container) type and/or classification features. Preferably, the spatially resolved sensor data together with the (container) type and/or classification features assigned to them are stored as a training data set (in particular on a and/or the non-volatile storage device). A plurality of training data sets is preferably generated in this way. The classification features can be the (above-described) classes of a container state and/or a container state variable relating thereto. For example, the spatially resolved sensor data assigned to a container can be classified with the types of defects and the like that occur in it.

Training the networks typically requires 10,000 or more marked and/or classified images per application. This marking and/or classification can be carried out locally or centrally by image processing experts. If the images of a customer or operator of a container inspection apparatus are stored on data carriers according to application, type and classification, these can be used for training (with the customer's permission).

Furthermore, these image databases can be used to provide the customer with an estimation of whether the new network will increase classification performance or decrease misclassification by applying the new network to in particular all stored images from the past before importing a network. This allows, for example, the image database to be used as the above-mentioned non-volatile storage device. The statistical evaluation variable can be determined based on these stored images.

It is also conceivable (additionally or alternatively) that spatially resolved sensor data from containers (or data derived therefrom) are used as training data, which were recorded by a sensor device of (at least) one other, preferably identical, container inspection apparatus (preferably from the same manufacturer). This offers the advantage that a large plurality of sensor data can be provided and used.

It is also conceivable that the training data used are spatially resolved sensor data (or data derived therefrom) generated (exclusively or partially) synthetically or generated via augmentation (data augmentation). This offers the advantage that approximately rarely occurring classes of container states can be simulated and the machine learning model can be trained efficiently.

Conceivably, the plurality of spatially resolved sensor data provided on the non-volatile storage device comprises (preferably synthetic) training data and/or consists of (preferably synthetic) training data, such as training images.

The training process can be carried out locally (at the container inspection apparatus and/or the setting device) and/or centrally and/or independently of location and/or on an external server in relation to the container inspection apparatus.

Preferably, a neural network trained in such a manner is used (in the framework and/or as a test container inspection model). Training is preferably carried out by monitored learning. However, it would also be possible to train the test container inspection model or the artificial neural network by means of unsupervised learning, reinforcement learning or stochastic learning.

Preferably, the test container inspection model is stored on an external storage device (in particular described in more detail below), preferably in relation to the container inspection apparatus and/or the real-time evaluation device and/or the setting device. Preferably, the setting device can access this external storage device and, in particular, process the (predetermined) plurality of spatially resolved sensor data by accessing it.

In a preferred method, a statistical rejection variable of the rejection device is determined in a working mode of the container inspection apparatus on the basis of a (successful) rejection and/or a non-rejection of a plurality of inspected, in particular successive, containers of the container stream by the rejection device. Preferably, the determined statistical rejection variable is used as an evaluation criterion (and/or to determine an evaluation criterion) for the test container inspection model.

This offers the advantage of proposing a model-independent, objectively measurable and accessible evaluation criterion that is independent of the real-time container inspection model currently used by the container inspection apparatus to evaluate the spatially resolved sensor data. As explained above in connection with the statistical rejection variable for the evaluation of a test container inspection model, the applicant has found that a behavior of the statistical rejection variable, approximately the total rejection rate, is a very good indicator for the evaluation of a new test container inspection model. A reduction in the statistical evaluation variable, such as the statistical rejection variable, can also be an indicator that the false rejection rate is decreasing while the inspection accuracy remains the same. As explained in detail above, this is advantageous in that it allows indirect conclusions to be drawn about the effect of a change in the (test) container inspection model on the false rejection rate, which cannot be determined per se.

Advantageously, the effect of a change or a (repeated) training process of the test container inspection model on the statistical rejection variable can be observed in the real-time evaluation device and thus the changed test container inspection model can be evaluated not only after the real-time container inspection model has been changed, but an evaluation of the changed test container inspection model is already possible before it is used in a working mode of the container inspection apparatus. This means that numerous incorrect discharges can be avoided and thus resources conserved. Furthermore, an evaluation and optimization of the test container inspection model without interrupting the working mode is possible.

In a further preferred method, the provision of a new test container inspection model and/or a change of the test container inspection model is suggested and/or initiated depending on the statistical evaluation variable. Before arming a new threshold value or a new test container inspection model, a what-if statistic can be calculated, for example by determining at least one statistical evaluation variable. A what-if statistic shows the future changed behavior of the machine even before a change. This allows the customer admin or image processing expert to test in advance how a change would affect detection performance and/or false rejection. It is also conceivable to test a set of images of defined test bottles against the modified model. This set of images of test bottles represents a standardized test that can be used to check all settings and models before they are set. Preferably, therefore, a fixed set of spatially resolved sensor data is used for several, preferably for at least two, preferably for at least five, preferably for at least 10, preferably for at least 20 (in particular in a fixed predetermined period of time, such as commissioning, and particularly preferably for all of them) test container inspection models for their respective evaluation. It is conceivable that on an output device, in particular a display device, it is visually indicated whether the change of the test container inspection model is suggested and/or initiated.

In a further advantageous method, a new training process of the trainable test container inspection model machine learning and/or a new training process is triggered depending on the statistical evaluation variable (and/or depending on the evaluation criterion). The further training process can advantageously result in continuous system optimization and continuous fine-tuning of the container inspection apparatus.

Preferably, a renewed training process (to improve the inspection performance or classification performance or detection accuracy of the test container inspection model) is carried out if a low rejection rate, in particular the false rejection rate, allows a further increase in inspection performance or detection accuracy.

An additional class of a container state can be taken into account by the renewed training process or by providing a new test container inspection model (compared to the set real-time container inspection model and/or to the test container inspection model (previously) evaluated in the setting device). For example, the test container inspection model can detect and/or check an additional defect type (compared to the set real-time container inspection model). Furthermore, the number of training data can be substantially increased by the renewed training process, so that a more precise training and in particular an increase in the inspection performance of the test container inspection model for limit value cases can be achieved.

For example, in the renewed training process, in particular to increase the classification performance of the test container inspection model, another class of container states can be activated and/or added, preferably depending on the statistical evaluation variable. However, it is also conceivable that a class of the predefined classes of container states is deactivated or removed.

Preferably, training data comprising limit cases of (single or several) classes of container states are used or selected for the renewed training process of the test container inspection model (to increase the classification performance). In such limit value cases, for example, one class of a container state is just assumed to be present. Approximately one defective location on a container can still be classified as a defect (by the specialist personnel). This allows the training process to be designed in a particularly efficient way.

Preferably, the renewed training process is carried out on the basis of, in particular selected, spatially resolved sensor data of inspected containers stored or provided on the non-volatile storage device (in particular new). The stored, spatially resolved sensor data used for the renewed training process are preferably stored together with variables that can be assigned or are assigned to them and are characteristic of a classification and/or marking and/or annotation (in particular with regard to the predefined classes of container states).

However, it is also conceivable that synthetic training data could be used for the renewed training process. This offers the advantage that limit value cases, in which, for example, a class of a container state is just assumed to be present, can be provided or generated in a comparatively faster or simpler way.

In a further advantageous method, new test container inspection models are continuously evaluated as a function of the statistical evaluation parameter and/or (renewed) training processes of the test container inspection model are continuously carried out and preferably the test container inspection model trained in such a manner is evaluated until an in particular predetermined statistical evaluation parameter is reached. This preferably creates a feedback loop. This feedback loop enables continuous system optimization. This can further increase the efficiency of the filling line. The selection of neural networks or the change of a parameter can be evaluated on the basis of objective what-if statistics in a short time without affecting ongoing production.

Preferably, the method comprises generating a (modified and/or new) test container inspection machine learning model which results from the (further) training process from the provided test container inspection model and/or from the continuous evaluation and selection of new test container inspection models (and which (therefore) in particular fulfills the predetermined statistical evaluation parameter or achieves the predetermined statistical evaluation parameter). This test container inspection model generated in this way can in particular finally be used (as a result of the evaluation process and selection and/or training process of test container inspection models) in the working mode of the (set) container inspection apparatus.

In a further advantageous method, the setting mode can be and/or is performed in a time-decoupled manner from the working mode, in which the plurality of spatially resolved sensor data to be retrieved in the setting mode is recorded by the at least one sensor device and made available on the non-volatile storage device. This offers the advantage that the setting mode can be carried out independently of the time period and the time in which and/or at which the container type to be adjusted is inspected.

Preferably, at least one rejection parameter is specified for each specified class of a container type (for which a container state variable is determined). The rejection parameter and the container state variable can be used to determine whether the container should be rejected. For example, the rejection parameter can be used to specify a threshold value above which the container is assigned the presence of an undesirable defect or fault (and should therefore be rejected).

It is possible to change or set the rejection parameter by means of operator input. The respective rejection parameters are preferably stored in the real-time evaluation device. They can appear as parameters in the real-time container inspection model, but it is also conceivable that they are stored as parameters independent of the model. Similarly, corresponding parameters can be provided in the setting device and/or the test container inspection model.

Preferably, the determined statistical rejection value is used as an evaluation criterion for the (rejection) parameters. This offers the advantage that the effect of the rejection thresholds on the rejection rate or the incorrect rejection can also be tested (in advance). Preferably, the, in particular all, (rejection) parameters (for the respective container state variables) can be transferred from the real-time evaluation device to the setting device (and vice versa).

In a further preferred method, the real-time container inspection model is a trainable machine learning model comprising a set of parameters, in particular trainable parameters, which are set to values learned as a result of a training process. The real-time container inspection model can have all the (preferred) design features described above in connection with the test container inspection model, either individually or in combination with one another.

In particular, the real-time container inspection model may be a previous test container inspection model. Through this feedback loop (based on the continuous improvement of the inspection performance of a single test container inspection model), in particular with repeated training of the test container inspection model and setting as a real-time container inspection model, continuous system or container inspection apparatus optimization can take place.

In a further preferred method, the setting device is provided with at least one further, in particular trainable, machine learning test container inspection model which is different from the test container inspection model and comprises a set of parameters, in particular trainable parameters, which are set to values which have been learned as a result of a training process. Preferably, at least one further statistical evaluation parameter is determined using the at least one further test container inspection model. The further test container inspection model can have all the (preferred) design features described above in connection with the test container inspection model, either alone or in combination with one another.

This allows two test container inspection models (to be evaluated) to be compared with one another in terms of their classification performance and/or detection performance and/or their rejection rate or false rejection rate.

In a further preferred method, an evaluation and/or approval of the at least one further test container inspection model is carried out by comparing the statistical evaluation variable with the at least one further statistical evaluation variable. Preferably, such a release is carried out by an operator or the configurator by operator input (in particular at a human-machine interface device).

In a further preferred method, the evaluation criterion is used as the basis for enabling (in particular by operator input, in particular at the human-machine interface device, for example by a configurator or an operator) the use of the test container inspection model as a real-time container inspection model of the real-time evaluation device.

Preferably, the test container inspection model is provided (in particular only) in response to a release (which can preferably be performed by operator input, in particular at the human-machine interface device, approximately by a configurator or an operator) of the real-time evaluation device. Preferably, use of the test container inspection model as a real-time container inspection model can be activated, in particular after approval and/or authorization has been granted.

Preferably, in order to transmit the test container inspection model to the real-time evaluation device, access to an in particular external and/or cloud-based server on which the test container inspection model or characteristic data for this is stored can be enabled and/or provided and/or a communication connection for data exchange can be constructed and/or preferably access authorization can be granted.

Preferably, the (tested) test container inspection model is used as a (new) real-time container inspection model (in a working mode) if the detection performance of the test container inspection model is improved while the false rejection rate remains the same or is reduced.

Preferably, in particular in response to a release, authorization data is transmitted to the container inspection apparatus and/or to an operator of the container inspection apparatus for accessing and/or transmitting and/or downloading the test container inspection model to the real-time evaluation device (and using it as a real-time container inspection model).

Preferably, the setting device evaluates the test container inspection model by evaluating the retrieved plurality of spatially resolved sensor data by the test container inspection model. The evaluation is preferably carried out container by container, i.e. the spatially resolved sensor data, which each represent an individual container, are each evaluated separately and/or independently of each other and preferably (in each case) a container state variable is determined. The statistical evaluation variable is preferably determined on the basis of the container status variables determined for the plurality of spatially resolved sensor data.

To evaluate the spatially resolved sensor data, the setting device preferably processes this sensor data or data derived from it using the test container inspection model. By using the test container inspection model, at least one (computer-implemented) computer vision method is used in which (computer-implemented) perception and/or detection tasks are performed, for example (computer-implemented) 2D and/or 3D object recognition methods and/or (computer-implemented) methods for semantic segmentation and/or (computer-implemented) object classification ("Image classification") and/or (computer-implemented) object localization and/or (computer-implemented) edge detection.

Preferably, the test container inspection model is fed the spatially resolved sensor data or data derived from it as input variables. Preferably, the test container inspection model outputs at least one container state variable and preferably a plurality of container state variables as output variables.

During object classification, an object detected and/or displayed in the spatially resolved sensor data or data derived from it in relation to a container is assigned to a class (or the previously taught-in and/or predefined class) of a container state. In object localization, a location of an object detected and/or displayed in the spatially resolved sensor data (in particular in relation to the spatially resolved sensor data) is determined or ascertained, in particular in addition to an object classification, which location is marked and/or highlighted by a so-called bounding box. In semantic segmentation, a class of a container state (for classifying an object) (in particular from a predefined plurality of classes of a container state) is assigned to each pixel of the spatially resolved sensor data or data derived from it (class annotation). The classes of a container state (for classifying the spatially resolved sensor data or data derived therefrom with respect to a container) are preferably those and/or some and/or all of the classes of container states described above.

In a preferred method, in the working mode, the at least one sensor device captures the plurality of spatially resolved sensor data which is provided on the non-volatile storage device for evaluating the test container inspection model. This offers the advantage that the test container inspection model can be evaluated with spatially resolved sensor data specific to the container inspection apparatus to be set.

However, it is also conceivable that external spatially resolved sensor data could be used for evaluation. For example, a plurality of spatially resolved sensor data recorded by a different (but preferably identical in construction) container inspection apparatus could be used (which is provided on the non-volatile storage device for this purpose).

Preferably, to evaluate the test container inspection model for all spatially resolved sensor data of the retrieved plurality of spatially resolved sensor data, at least one container state variable and preferably a plurality of container state variables are determined individually for the spatially resolved sensor data in relation to exactly one container.

Preferably, the statistical evaluation variable is determined by independently evaluating the spatially resolved sensor data of different containers and determining at least one container status variable in each case. In other words, each container shown in the spatially resolved sensor data is evaluated individually and a container status variable is determined for each. The statistical evaluation variable is determined as a function of the respective container status variables of the plurality of spatially resolved sensor data.

It may be that a plurality of (mutually different) classes of a container state are relevant for the inspection task. For example, a mouth and a bottom area can be controlled at the same time, so that at least one class for a container state of the mouth and at least one class for a container state of the bottom area can be specified. In this case, one container state variable is determined for the class for the container state of the mouth and one for the class for the container state of the bottom area.

Preferably, a plurality of container state variables are determined during the evaluation of spatially resolved sensor data, which are assigned to exactly one container or which represent exactly one container. The plurality of container state variables refers to, in particular, different classes (in pairs) of a container state of the container (which is represented in the spatially resolved sensor data). Each container state variable preferably refers to exactly one class of a container state. Preferably, each container state variable is characteristic of a probability of the presence of this class of a container state in the respective processed sensor data with respect to exactly one container (or in the container for which the processed sensor data was recorded).

The real-time container inspection model and/or the test container inspection model is preferably a type-specific model, i.e. for exactly one container type and/or production type. The present invention is only described in relation to one container type and/or production type in each case. It is understood (and should be understood herein) that the container inspection apparatus comprises for a plurality of container types and/or production types each have a real-time container inspection model or a common real-time container inspection model for the plurality of container types and/or production types and the setting device can each provide a test container inspection model or a common test container inspection model for the plurality of container types and/or production types, for which all the features described in relation to the real-time container inspection model or the test container inspection model, individually or in combination together, are also to be regarded as disclosed.

Preferably, the container flow is an (in particular continuous) flow (on the transport path) of successive or consecutive containers. The container flow can be guided or transported in a single lane or in multiple lanes (b the transport device) in certain areas and preferably within the totality of the container inspection apparatus (as a mass flow). Preferably, at least one sensor device is assigned to each lane of the container flow and detects each container of the container flow located on this lane.

Preferably, the working mode is a running (production) mode of the container inspection apparatus and/or a running (production) mode of a container treatment plant, such as a container filling plant, which has the container inspection apparatus. In particular, the working mode may be a production mode. In particular, the working mode is not a test mode with a transport speed of the containers (as they pass through the container inspection apparatus) that is approximately lower than a transport speed in a working mode.

Preferably, the setting device retrieves and/or processes the spatially resolved sensor data stored on the non-volatile storage device for the setting operation substantially simultaneously. Thus, in particular, a statistical rejection variable of the rejection device is not determined by determining rejection variables of containers one after the other and at different times on the basis of sensor data of these containers retrieved one after the other, but the predetermined plurality of recorded spatially resolved sensor data can be retrieved substantially simultaneously and is substantially retrieved together for evaluation and for determining the statistical evaluation variable and processed for this purpose.

The present invention is further directed to a container inspection apparatus for inspecting containers with at least one transport device for transporting containers to be inspected as a container stream along a predetermined transport path in a working. The container inspection apparatus has at least one sensor device for recording, in particular optically, spatially resolved sensor data in relation to a container to be inspected in the container stream during working mode.

Furthermore, the container inspection apparatus has a real-time evaluation device, in particular processor-based, which is suitable and intended for evaluating the spatially resolved sensor data of the individual inspected containers in real time during working mode using an adjustable real-time container inspection model.

Furthermore, a non-volatile storage device is provided on which a plurality of spatially resolved sensor data can be stored and/or made available. In a setting mode (of the container inspection apparatus), the plurality of spatially resolved sensor data stored or provided on the non-volatile storage device can be retrieved by a, in particular processor-based, setting device.

According to the invention, a test container inspection model, in particular a trainable test container inspection model, preferably a machine learning model, can be made available and/or provided to the setting device for evaluation, in particular with regard to use as a real-time container inspection model in the real-time evaluation device. Preferably, the test container inspection model comprises a set of in particular trainable parameters which are set to values learned as a result of a training process. Preferably, the test container inspection model is to be evaluated with respect to a working mode of the container inspection apparatus in which the test container inspection model is set in the real-time evaluation device as the real-time container inspection model.

The setting device for evaluating the test container inspection model is suitable and intended for determining a statistical evaluation variable on the basis of the retrieved plurality of spatially resolved sensor data.

In the context of the container inspection apparatus, it is therefore also proposed to provide a setting mode that can be decoupled from the working mode and/or carried out independently in order to be able to (objectively) evaluate the test container inspection model in a short time on the basis of the statistical evaluation variable, such as a what-if statistic, without impairing ongoing production.

Preferably, the container inspection apparatus is configured, suitable and/or intended to carry out the method described above as well as all the method steps already described above in connection with the method, either individually or in combination with one another. Conversely, the method can be equipped with all the features described in relation to the container inspection apparatus and/or setting device, either individually or in combination with one another, and use these to perform the method.

Preferably, the container inspection apparatus is an empty bottle inspection machine. This can include bottom, mouth, sidewall, thread and/or contour detection. The container inspection apparatus can also be a full bottle inspection machine, preferably with detection of suspended matter and/or foreign matter lying on the container bottom and/or with optical fill level detection.

In an advantageous embodiment, the setting device is arranged at least partially locally separated with respect to the real-time evaluation device and/or the sensor device. Preferably, the setting device is arranged completely separate from the real-time evaluation device. Preferably, the setting device is arranged outside the housing of the real-time evaluation device and particularly preferably outside a hall in which the container inspection apparatus or in which the real-time evaluation device is arranged. This offers the advantage that the operator or the configurator of the container inspection apparatus does not have to be present at the location of the container inspection apparatus to adjust or fine-tune it, but can configure the container inspection apparatus and in particular the real-time evaluation device locally separately via remote maintenance and/or via remote communication access.

It is conceivable that the setting device is not arranged in a stationary position, but is mobile in relation to the container inspection apparatus. It is also conceivable that several setting devices can be present and/or configured at the same time, at least temporarily. For example, it is conceivable that an operator of the treatment device (approximately directly at the location of the real-time evaluation device) and at the same time an (external) operator or configurator each test (independently of each other) the effect of a changed real-time container inspection model by a setting device.

Preferably, a wireless communication connection, in particular encrypted, is provided between the real-time evaluation device and/or the setting device for exchanging data relating to the real-time container inspection model and/or the (rejection) parameters and/or the test container inspection model. Data can be exchanged at least in part via a public network, such as the Internet. The advantage of wireless communication (at least in portions) is that it makes it easier to separate the real-time evaluation device and the setting device.

In a further advantageous embodiment, the container inspection apparatus has a rejection device and is suitable and intended for rejecting an inspected container depending on the evaluation carried out by the real-time evaluation device. The statistical evaluation variable is characteristic for a statistical rejection variable of the rejection device, particularly for a forecast of the statistical rejection variable of the rejection device.

Preferably, the container inspection apparatus comprises the rejection device and/or preferably the rejection device is part of the container inspection apparatus. Preferably, the container inspection apparatus is suitable and intended for rejecting an inspected container as a function of the evaluation performed by the real-time evaluation device (based on the associated spatially resolved sensor data), and wherein preferably the statistical evaluation variable is characteristic of a statistical rejection variable of the rejection device.

It is also conceivable that the rejection device is part of the same (container treatment) system as the container inspection apparatus, but is not part of the container inspection apparatus. For example, the container inspection apparatus could be a first structural unit and the rejection device could be a separate or second structural unit, in particular different from the first container inspection apparatus. Preferably (even then), a container state variable determined by the container inspection apparatus or a variable derived therefrom can be transmitted and/or made available to the rejection device (via a communication connection). Preferably, the rejection device is arranged downstream of the (at least one) sensor device in the transport direction of the containers.

In a further advantageous embodiment, the transport device transports the containers from a first treatment device to a second treatment device, in particular in the working mode. Preferably, the first and/or the second treatment device is selected from a group comprising a cleaning apparatus for cleaning the containers, a filling apparatus for filling the containers, a forming apparatus for forming a plastic preform into a plastic container, in particular a blow molding machine, a labeling apparatus and similar, and combinations thereof. Preferably, the transport device transports the inspected containers from the sensor device to the rejection device.

Preferably, the setting device is suitable and intended for providing the at least one statistical evaluation variable to an output device, preferably a display device such as a display, for output to an operator.

Preferably, the sensor device is selected from a group comprising an image recording device, such as a camera, a CMOS sensor (CMOS abbreviation for complementary metal-oxide-semiconductor), a CCD sensor, a 3D sensor, an X-ray-based image recording device, an optical element, a thermal imaging camera and similar, and combinations thereof.

Preferably, the non-volatile storage device is a fixed storage. Preferably, spatially resolved sensor data of at least 50, preferably at least 100, preferably at least 1,000, preferably at least 5,000, preferably at least 10,000, preferably at least 30,000 containers are stored (particularly in the set-up mode) in the non-volatile storage device (by the sensor device). Preferably, all of this sensor data were recorded by the at least one sensor device (or by the several sensor devices) and particularly preferably stored (in real time) on the volatile storage device of the container inspection apparatus (which may be a ring buffer, for example).

Preferably, the non-volatile storage device is an external storage device, in particular a cloud-based storage device and/or an external server (including storage device), wherein the storage device is accessed in particular via the Internet (and/or via a public and/or private network, in particular at least in sections wired and/or wireless). An external server is in particular an external server, in particular a backend server, in relation to a container inspection apparatus and/or real-time evaluation device and/or setting device.

The external server is, for example, a backend, in particular of a container inspection apparatus manufacturer or a service provider, which is configured to manage spatially resolved sensor data (in particular of a plurality of sensor devices and/or a plurality of container inspection apparatus) and/or to set container inspection apparatus. The functions of the backend or the external server can be carried out in (external) server farms. The (external) server can be a distributed system.

The present invention is further directed to a setting device for performing a setting mode of a container inspection apparatus for inspecting containers. The container inspection apparatus has at least one transport device for transporting containers to be inspected as a container stream along a predetermined transport path in a working mode. Furthermore, the container inspection apparatus has at least one sensor device for recording, in particular optically, spatially resolved sensor data in relation to a container to be inspected in the container stream during working mode. Furthermore, the container inspection apparatus has a real-time evaluation device which is suitable and intended for evaluating the spatially resolved sensor data of the individual inspected containers in real time during working mode using an adjustable real-time container inspection model.

A non-volatile storage device is provided on which (the setting device for the setting mode) a plurality of spatially resolved sensor data (which are assigned to a plurality of containers) can be made available.

Preferably, the container inspection apparatus is suitable and intended for storing a plurality of the spatially resolved sensor data acquired by the sensor device on the non-volatile storage device during working mode.

The setting device is suitable and intended for retrieving the plurality of provided or stored spatially resolved sensor data in a setting mode. Furthermore, a test container inspection model can be provided or is provided to the setting device for evaluation with regard to an use as a real-time container inspection model in the real-time evaluation device.

According to the invention, the setting device for evaluating the test container inspection model is suitable and intended for determining a statistical evaluation variable on the basis of the retrieved plurality of spatially resolved sensor data. Preferably, the setting device evaluates the plurality of spatially resolved sensor data by means of the test container inspection model or processes the plurality of spatially resolved sensor data by means of the test container inspection model.

The container inspection apparatus and/or the setting device can be equipped with all the features described above in connection with the container inspection apparatus, either individually or in combination with one another, and vice versa. In particular, the test container inspection model and/or the real-time container inspection model may be designed according to an embodiment described above.

The present invention of the container inspection apparatus and the method for performing a setting mode have been described in particular in connection with a rejection device and a rejection variable as well as a statistical rejection variable. However, the present invention can also be applied in general to container inspection apparatus with at least one treatment device, which treats the inspected containers as a function of the evaluation carried out by the real-time evaluation device. Here, a statistical variable can be used as a statistical evaluation variable, in particular instead of the statistical rejection variable, which is characteristic of the treating of an inspected container (or an intermediate result) carried out and/or to be performed by the treatment device depending on the evaluation (for example, depending on an inspection result). The applicant reserves the right to also claim a method and a container inspection apparatus directed thereto.

The present invention of the container inspection apparatus and the method for setting a container inspection apparatus have each been described in connection with a container to be inspected. However, the present invention can also be generally applied to inspection apparatus for inspecting unit loads. The applicant reserves the right to also claim a method and a container inspection apparatus directed thereto.

The present invention is further directed to a system comprising a container inspection apparatus in accordance with one of the embodiments described above and a setting device in accordance with one of the embodiments described above.

The present invention is further directed to a computer program or computer program product comprising program means, in particular a program code, which represents or encodes at least individual method steps of the method according to the invention, in particular the method steps carried out by the setting device (in particular with regard to the computer-implemented processing of the predetermined plurality of spatially resolved sensor data and the determination of the statistical predicted variable), and preferably one of the preferred embodiments described, and is designed to be executed by a processor device.

The present invention is further directed to a data storage on which at least one embodiment of the computer program according to the invention or a preferred embodiment of the computer program is stored.

The present invention is further directed to a container inspection apparatus for inspecting containers with at least one transport device for transporting containers to be inspected as a container stream along a predetermined transport path. Furthermore, the container inspection apparatus has at least one sensor device for detecting, in particular optically, spatially resolved sensor data in relation to a container to be inspected in the container stream. Furthermore, the container inspection apparatus has a real-time evaluation device for determining at least one container state variable in relation to the inspected container, wherein the recorded spatially resolved sensor data of the inspected container or data derived therefrom are processed using a real-time container inspection model to determine the at least one container state variable. The real-time evaluation device is suitable and intended for providing the container state variable or a variable derived therefrom to a rejection device for rejection of the inspected container as a function of the at least one container state variable.

According to the invention, a simulation evaluation device (referred to above as setting device) is provided for simulating the real-time evaluation device, which is suitable and intended for determining at least one statistical forecast rejection variable (referred to above as statistical evaluation variable) for forecasting a statistical rejection variable of the rejection device in a working mode of the container inspection apparatus. The simulation evaluation device is suitable and intended for retrieving a predetermined plurality of spatially resolved sensor data of containers, in particular stored on a non-volatile storage device, and for evaluating the retrieved plurality of spatially resolved sensor data or data derived therefrom using a, in particular trainable, simulation container inspection model (also referred to above as a test container inspection model), simulation container inspection model (also referred to above as a test container inspection model), which comprises a set of, particularly trainable, parameters which are set to values which have been learned as a result of a training process, wherein the at least one statistical forecast output variable is thereby determined.

In the following, the device referred to above as the setting device is also referred to as the simulation evaluation device, wherein these can be mutually equipped with features which are described in relation to these two devices. Similarly, the simulation container inspection model can be equipped with all the features described above in connection with the test container inspection model and vice versa.

In a preferred embodiment, the simulation evaluation device is arranged at least partially locally separated with respect to the container inspection apparatus and/or the sensor device.

In a preferred embodiment, the container inspection apparatus and the simulation evaluation device are suitable, intended and configured in such a manner that the plurality of sensor data to be taken into account for determining the statistical forecast rejection variable can be retrieved by the simulation evaluation device at a later point in time, in particular by user input, with respect to their recording period and/or their storage period on the non-volatile storage device.

In a preferred embodiment, the simulation evaluation device is suitable and intended to retrieve the real-time container inspection model used by the real-time evaluation device and use it as the simulation container inspection model to determine the statistical forecast rejection variable.

In a preferred embodiment, the transport device transports the containers from a first treatment device to a second treatment device (and/or is particularly suitable and determined for this purpose). Preferably, the first and/or the second treatment device is selected from a group comprising a cleaning apparatus for cleaning the containers, a filling apparatus for filling the containers, a forming apparatus for forming a plastic preform into a plastic container, in particular a blow molding machine, a labeling apparatus and similar, and combinations thereof.

The present invention is further directed to a method for setting, in particular for fine setting, a container inspection apparatus with a transport device for transporting containers to be inspected as a container stream along a predetermined transport path, with at least one sensor device for detecting, in particular optically, spatially resolved sensor data in relation to a container of the container stream to be inspected, and with a real-time evaluation device for determining at least one container state variable in relation to the inspected container.

In order to determine the at least one container state variable, the recorded spatially resolved sensor data of the inspected container or data derived therefrom are processed using a real-time container inspection model, wherein the real-time evaluation device is suitable and intended for providing the container state variable or a variable derived therefrom to a rejection device for rejection of the inspected container as a function of the at least one container state variable.

According to the invention, a simulation evaluation device for simulating the real-time evaluation device determines at least one statistical forecast rejection variable for forecasting a statistical rejection variable of the rejection device in a working mode of the container inspection apparatus.

The simulation evaluation device retrieves a predetermined plurality of spatially resolved sensor data from, in particular inspected, containers and processes the retrieved plurality of spatially resolved sensor data or data derived therefrom using a, in particular trainable, simulation container inspection machine learning model comprising a set of, in particular trainable, parameters which are set to values learned as a result of a training process. This determines at least one statistical forecast rejection variable.

In an advantageous method, a statistical rejection variable of the rejection device is determined in a working mode of the container inspection apparatus on the basis of a rejection and/or a non-rejection of a plurality of inspected, in particular successive, containers of the container stream by the rejection device. The determined statistical rejection value is used as an evaluation criterion for the simulation container inspection model.

In a further advantageous method, based on the evaluation criterion, a release for use of the simulation container inspection model as a real-time container inspection model of the real-time evaluation device is provided and/or the simulation container inspection model is provided in response to a release of the real-time evaluation device.

In a further advantageous method, a further training step of the trainable simulation container inspection model is performed depending on the evaluation criterion, wherein the training step is preferably performed on the basis of, in particular selected, spatially resolved sensor data of inspected containers stored on the non-volatile storage device.

In a further advantageous method, training data, in particular spatially resolved sensor data of inspected containers of the container inspection apparatus for training the simulation container inspection model, is provided as a function of a comparison of the statistical forecast rejection variable with the statistical rejection variable of the rejection device.

In a further advantageous method, the real-time container inspection model is a trainable machine learning model comprising a set of parameters, in particular trainable parameters, which are set to values learned as a result of a training process.

In a further advantageous method, the real-time container inspection model is used as the simulation container inspection model and preferably the real-time container inspection model is provided to the simulation evaluation device for this purpose.

In a further advantageous method, the simulation container inspection model is different from the real-time container inspection model.

In a further advantageous method, the simulation evaluation device is provided with at least one further, in particular trainable, machine learning simulation container inspection model, which is different from the simulation container inspection model and comprises a set of parameters, in particular trainable parameters, which are set to values that have been learned as a result of a training process. At least one further statistical forecast rejection variable is determined using the at least one further simulation container inspection model.

In a further advantageous method, an evaluation and/or approval of the at least one further simulation container inspection model is carried out by comparing the statistical forecast rejection variable with the at least one further statistical forecast rejection variable.

Further advantages and embodiments emerge from the accompanying drawing.

In the drawings:

FIG. 1 shows a schematic diagram of a container inspection apparatus according to an embodiment of the invention.

FIGS. 1 and 1A show a schematic diagram of a container inspection apparatus 1 according to an embodiment of the invention. The container inspection apparatus 1 has a sensor device 20 for the detection and/or receptacle of spatially resolved sensor data of a container. Furthermore, the container inspection apparatus 1 has a, preferably volatile, (real-time) storage device 22, which is approximately an image storage. (All) Sensor data recorded by the sensor device 20 is stored (at least and preferably exclusively temporarily) on this particularly volatile (real-time) storage device or on this image storage. Referring also to FIG. 1A, the container inspection apparatus 1, includes a transport device 2 and first and second treatment devices 3, 4, wherein the first and second treatment devices 3, 4, preferably are selected from a group comprising a cleaning device, for cleaning the containers, a filling device for filling the containers, a forming device for forming a plastic preform into a plastic container, a blow molding device and a labeling device, as will be described below.

The container inspection apparatus shown in FIG. 1 is described here with reference to camera images as spatially resolved sensor data and a camera as sensor device 20. However, it is clear to a person skilled in art that the aspects described here can be implemented in an analogous manner with other sensor device and thus other sensor data.

During production, the inspection machine or the container inspection apparatus 1 or a system for setting a container inspection apparatus stores as many camera images as possible (or more generally spatially resolved sensor data)—preferably in accordance with a storage strategy 44 that can be preset, for example by an operator or by means of an operator input—on an in particular non-volatile storage device 34.

In other words, based on the storage strategy 44 (which is predetermined and in particular can be predetermined by means of operator input at a human-machine interface device 42), an assessment 32 is made and/or an instruction is generated (such as by generating a control signal), in particular by the container inspection apparatus 1 and in particular by a processor device of the container inspection apparatus, in accordance with predetermined criteria for storing the camera image data, whether sensor data (in particular images) recorded by the sensor device 20 and/or stored in the in particular volatile (real-time) storage device 22 are to be stored in a storage device 34 (different from the storage device 22) and/or transmitted to the latter.

According to the storage strategy 44, it is thus determined, for example, whether only the "good" images, for example, the camera images that were assessed by the real-time container inspection model and/or the real-time evaluation parameters as containers not to be rejected, only the "bad" images (i.e. the camera images of the containers to be rejected, for example) or all images (i.e. both camera images of containers to be rejected and of containers not to be rejected, i.e. without further preference) 32 are stored in the storage device 34 and/or transmitted to it from the (in particular volatile) storage device 22.

The camera images are preferably stored sorted by production type (in the in particular non-volatile storage device 34).

The in particular non-volatile storage device 34, in particular an image storage, is preferably a fixed storage and/or a storage on which the sensor data can be stored and/or retrieved not only temporarily. Preferably, the, particularly non-volatile, storage device has a storage capacity for approximately 100 images (or for spatially resolved sensor data of approximately and preferably more than 100 containers), preferably for more than 1000 images and particularly preferably for more than 10,000 images.

Preferably, the container inspection apparatus 1 has a real-time evaluation device 24 (for performing a real-time image evaluation). This determines, in particular on the basis of the sensor data (here camera images) recorded by the sensor device 20, which are stored in particular on the volatile storage device 22, in particular as (inspection) result 26, at least one container status variable in relation to the (respective) inspected container. Preferably, on the basis of the (inspection) result 26 and/or on the basis of the determined container state variable, a rejection variable is determined for each inspected container, which is characteristic of whether it should be rejected (particularly by a rejection device 28) (rejection yes/no).

With respect to the (inspection) results 26 of a plurality (in particular successive) of inspected containers of the container stream, a statistic 30 is preferably generated (approximately by determining a statistical evaluation variable), for example by determining a statistical rejection variable, such as a rejection rate.

According to a preferred embodiment, the camera system (or container inspection apparatus 1) preferably runs a set of real-time evaluation parameters, which are also known as sensitivity parameters, or a real-time container inspection model in production (real-time). These sensitivity parameters represent the real-time evaluation parameters of the container inspection apparatus 1 or the real-time evaluation device 26, approximately. These can be changed and/or adjusted (in particular by an operator input, approximately via an input device 42), in particular individually.

At the same time, ROI, camera parameter and sensitivity changes can be made, preferably in a setting mode of the container inspection apparatus 1, without affecting the real-time part.

Preferably, a setting device 38 (in particular as part of the container inspection apparatus 1) is provided in which, without influencing the real-time part, in other words without changing the real-time evaluation parameters used in the real-time inspection of the containers of the container stream to be inspected or without changing the real-time container inspection model used in the real-time inspection of the containers of the container stream to be inspected, an effect of changes to at least one real-time evaluation parameter or an effect of changes to the real-time container inspection model can be simulated.

In other words, the setting device 38 in particular performs an "offline image evaluation", wherein (in this setting mode) sensitivity adjustments (for example via changes to the test container inspection model) can be made. For this purpose, in this preferred embodiment, a test container inspection model is provided to the setting device 38 (and stored for example in a storage device of the setting device), approximately by transmitting the real-time container inspection model (for example via the communication connection 46) from the real-time evaluation device 24 to the setting device 38.

Preferably, changes to the test container inspection model can be initiated by an operator via a human-machine interface device 42. For example, a new test container inspection model can be loaded. It is also possible for the user to arrange for the existing test container inspection model to undergo a (further) training process. It is also conceivable that the new and/or modified test container inspection model is suitable and intended in comparison to the or a previously evaluated test container inspection model for the detection or perception of a previously not (or not sufficiently) considered defect class of a container or class of a container condition. However, it is also conceivable that previously considered defect classes or class(es) of a container state are omitted or deactivated, so that they are no longer taken into account during a container inspection by means of this (updated or new or modified) test container inspection model.

Furthermore, according to the preferred embodiment, a transmission 36 (preferably on request) of the sensor data (here camera images) stored on the, in particular non-volatile, storage device 34 (captured by the sensor device 20, in particular of a plurality of containers) to the setting device 38, in particular for preview statistics calculation and/or for determining a statistical prognosis inspection variable, such as a statistical evaluation variable. For example, a forecast of the rejection rate (by the setting device 38) can be determined as a statistical evaluation variable. This determined statistical data 40, referred to in FIG. 1 as "statistical data preview", for example a determined statistical evaluation variable, can be output to the operator or configurator by the human-machine interface device 42, for example a display device 42, and in particular can be output visually.

Furthermore, preferably also by the human-machine interface device 42, for example a display device 42, the "statistical data of production" marked with reference numerals 48 in FIG. 1, which is a statistical variable from the production mode or working mode of the container inspection apparatus, can be output to the operator or configurator, particularly optically. For example, a (statistical) rejection rate (determined or measured in a working mode) can be transmitted as "statistical data of production" and preferably compared with the statistical evaluation variable (for predicting a rejection variable of the rejection device).

Preferably, each time the test container inspection model is changed, the machine (or the setting device 38) starts to re-inspect the stored camera images with the changed test container inspection model in a background process. After just a few seconds, it shows the operator how the change in the test container inspection model would affect the rejection rate (by calculating and/or determining and outputting a statistical evaluation variable based on the images already processed, which is for example characteristic of a statistical rejection variable of the rejection device).

The estimation of the rejection rate becomes more accurate the more stored images are re-inspected. The display could therefore initially show a rough estimate, which is preferably updated continuously, while the camera images are preferably inspected further in the background. In particular, a high level of statistical certainty is achieved after just 30 seconds and the displayed value will hardly fluctuate.

If the rejection rate changes as desired, the operator can save the modified test container inspection model and thus transfer it (as a real-time container inspection model) to the production process. This is characterized by the reference numerals 46, by which a (data) communication connection (from the human-machine interface device 42 (for example an input and display device) and/or an input device and/or an output device and/or from the setting device 38) for transmitting the test container inspection model (or characteristic variables therefor) (only) by operator input (as a new real-time container inspection model) to the real-time evaluation device 24 is represented.

If the effect is not as desired, the configurator can check the inspection result on each individual camera image or discard the change.

To ensure that no outdated camera images are saved, the camera images of the current type can be deleted each time a parameter of the camera or lamp changes.

According to a preferred further embodiment, the setting device can use a KI-based test container inspection model to evaluate the spatially resolved sensor data (in this case camera images). The test container inspection model can be based on an (artificial) neural network (such as a CNN and/or DNN).

The statistical evaluation variable, which can be characteristic of a statistical rejection variable of a rejection device, for example, can also be used to draw conclusions about future behavior or a future change in the detection performance of the container inspection apparatus. This enables the customer admin or the operator of the container inspection apparatus or the image processing expert to test in advance how a change would affect the detection performance or false rejection.

This feedback loop allows continuous system optimization to take place. This can further increase the efficiency of the filling line. The selection of neural networks or the change of a parameter can be evaluated on the basis of objective what-if statistics in a short time without affecting ongoing production.

A preferred procedure (for example for the adjuster, in particular fine adjustment, of a container inspection apparatus using a neural network based (test) container inspection model) comprises:

- image storing with type and classification features;
- network training locally or centrally by image processing experts (If the necessary tools are provided and configured, a non-expert can also initiate new training. However, this person must first have received training/ instruction from an image processing expert in order to have a basic understanding of the processes and methods);

testing the network. If better detection performance is achieved with the same or reduced false rejection, offer/install a new network (in particular download cloud);

what-if statistics show the effect of new tested networks or threshold values in advance. The customer admin or teleservice can then decide whether the change becomes active.

The applicant reserves the right to claim all features disclosed in the application documents as essential to the invention, provided that they are novel over the prior art individually or in combination. It is also pointed out that features which can be advantageous in themselves are also described in the individual FIGURES. The person skilled in the art will immediately recognize that a particular feature described in a FIGURE can be advantageous even without the adoption of further features from this FIGURE. Furthermore, the person skilled in the art will recognize that advantages can also result from a combination of several features shown in individual or in different FIGURES.

LIST OF REFERENCE SIGNS

1 container inspection apparatus
2 transport device
3 first treatment device
4 second treatment device
20 sensor device, camera
22 volatile storage device
24 real-time evaluation device
26 result
28 rejection device
30 statistics
32 assessment storage of sensor data
34 storage device
36 transmission for preview statistics calculation
38 setting device
40 statistical data preview
42 input and display device
44 storage strategy
48 statistical data of production

The invention claimed is:

1. A method for performing a setting mode of a container inspection apparatus, in which, in a working mode, a transport device transports containers to be inspected as a container stream along a predetermined transport path and at least one sensor device detects spatially resolved sensor data with respect to the containers to be inspected, in particular optically, and a real-time evaluation device evaluates the spatially resolved sensor data of the individual inspected containers in real time with the aid of an adjustable real-time container inspection model, comprising:

a plurality of spatially resolved sensor data is provided on a non-volatile storage device, which is retrieved by a setting device in the setting mode;

the setting device is provided with a, in particular trainable, test container inspection model of machine learning, which comprises a set of, in particular trainable, parameters which are set to values which have been learned as a result of a training process, wherein the test container inspection model is to be evaluated with regard to a working mode of the container inspection apparatus, in which the test container inspection model is set in the real-time evaluation device as the real-time container inspection model;

to evaluate the test container inspection model, the setting device determines at least one statistical evaluation variable on the basis of the retrieved plurality of spatially resolved sensor data.

2. The method according to claim 1, wherein in the working mode, the at least one sensor device records the plurality of spatially resolved sensor data which is provided on the non-volatile storage device for evaluating the test container inspection model.

3. The method according to claim 2, wherein training data comprising a plurality of spatially resolved sensor data recorded by the at least one sensor device is used in the training process of the test container inspection model.

4. The method according to claim 2, wherein the provision of a new and/or a change of the test container inspection model is proposed and/or initiated depending on the statistical evaluation variable.

5. The method according to claim 2, wherein a renewed training process of the test container inspection model is carried out depending on the statistical evaluation variable.

6. The method according to claim 1, wherein training data comprising a plurality of spatially resolved sensor data recorded by the at least one sensor device is used in the training process of the test container inspection model.

7. The method according to claim 1, wherein the provision of a new and/or a change of the test container inspection model is proposed and/or initiated depending on the statistical evaluation variable.

8. The method according to claim 1, wherein a renewed training process of the test container inspection model is carried out depending on the statistical evaluation variable.

9. The method according to claim 1, wherein new test container inspection models are continuously evaluated as a function of the statistical evaluation parameter and/or continuous training processes of the test container inspection model are carried out and the test container inspection model trained in such a manner is evaluated until an in particular predetermined statistical evaluation parameter is reached.

10. The method according to claim 1 wherein the setting device determines the statistical evaluation variable independently of the real-time container inspection model set in the real-time evaluation device.

11. The method according to claim 1, wherein the at least one statistical evaluation variable is determined based on the test container inspection model, while at the same time containers are inspected in the container inspection apparatus based on the real-time container inspection model during ongoing working mode.

12. The method according to claim 1 wherein in the working mode an inspected container is rejected by a rejection device as a function of the evaluation carried out by the real-time evaluation device, and wherein the statistical evaluation variable is characteristic of a statistical rejection variable of the rejection device.

13. The method according to claim 1 wherein a statistical rejection variable of the rejection device is determined in the working mode of the container inspection apparatus on the basis of a rejection and/or a non-rejection of a plurality of inspected, in particular successive, containers of the container stream by a rejection device and the determined statistical rejection variable is used as an evaluation criterion for the test container inspection model.

14. The method according to claim 1 wherein the setting mode is performed separately in time from the working mode, in which the plurality of spatially resolved sensor data to be retrieved in the setting mode is recorded by the at least one sensor device and made available on the non-volatile storage device.

15. The method according to claim 1, wherein the test container inspection model is different from the real-time container inspection model set in the real-time evaluation device.

16. A container inspection apparatus for inspecting containers, having at least one transport device configured for transporting containers to be inspected as a container stream along a predetermined transport path in a working mode, having at least one sensor device configured for detecting, in particular optically, spatially resolved sensor data with respect to a container to be inspected of the container stream in the working mode, and with a real-time evaluation device which is configured for evaluating the spatially resolved sensor data of the individual inspected containers in real time in the working mode with the aid of an adjustable real-time container inspection model, and with a non-volatile storage device on which a plurality of spatially resolved sensor data can be stored and/or is stored, wherein, in a setting mode, the plurality of spatially resolved sensor data stored on the non-volatile storage device can be retrieved by a setting device, wherein the setting device is configured to provide a, in particular trainable, machine learning test container inspection model for evaluation with respect to an use as a real-time container inspection model in the real-time evaluation device, wherein the test container inspection model comprises a set of, in particular trainable, parameters which are set to values which have been learned as a result of a training process, wherein the setting device for evaluating the test container inspection model is configured for determining a statistical evaluation variable on the basis of the retrieved plurality of spatially resolved sensor data.

17. The container inspection apparatus according to claim 16, wherein the container inspection apparatus has a rejection device configured for rejecting an inspected container as a function of the evaluation carried out by the real-time evaluation device, wherein the statistical evaluation variable is characteristic of a statistical rejection variable of the rejection device.

18. The container inspection apparatus according to claim 16, wherein the transport device is configured to transports the containers from a first treatment device to a second treatment device and the first and/or the second treatment device is selected from a group comprising a cleaning device for cleaning the containers, a filling device for filling the containers, a forming device for forming a plastic preform into a plastic container, in particular a blow molding machine, a labeling device, and a combination thereof.

19. The container inspection apparatus according to claim 16, wherein the setting device is arranged at least partially locally separated with respect to the real-time evaluation device and/or the sensor device and wherein the container inspection apparatus has a rejection device configured for rejecting an inspected container as a function of the evaluation carried out by the real-time evaluation device, wherein the statistical evaluation variable is characteristic of a statistical rejection variable of the rejection device.

20. The container inspection apparatus according to claim 16, wherein the setting device is arranged at least partially locally separated with respect to the real-time evaluation device and/or the sensor device and wherein the transport device is configured to transports the containers from a first treatment device to a second treatment device and preferably the first and/or the second treatment device is selected from a group comprising a cleaning device for cleaning the containers, a filling device for filling the containers, a forming device, a blow molding machine, a labeling device and similar, and a combination thereof.

* * * * *